Dec. 2, 1969     A. RUTENBERG     3,482,031
HIGH TENSION ELECTRIC POWER CONDUCTOR
SUSPENSION ARRANGEMENTS
Filed Oct. 26, 1967
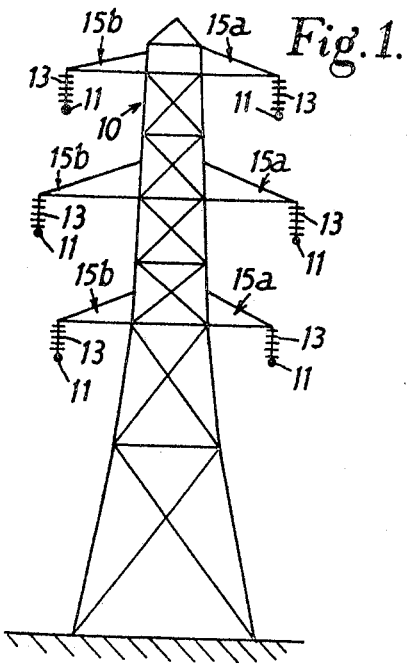
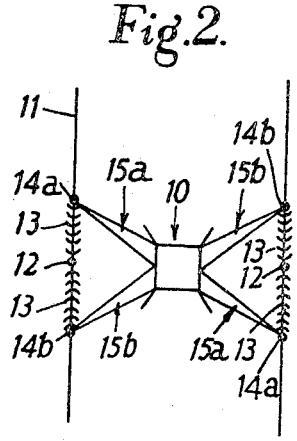
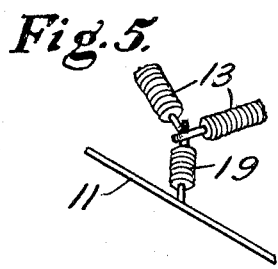
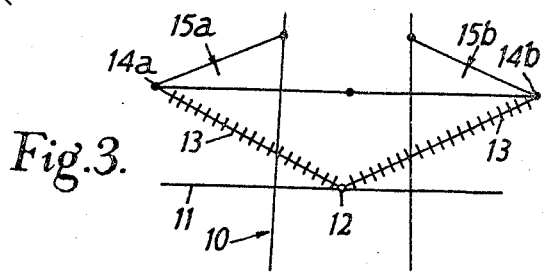
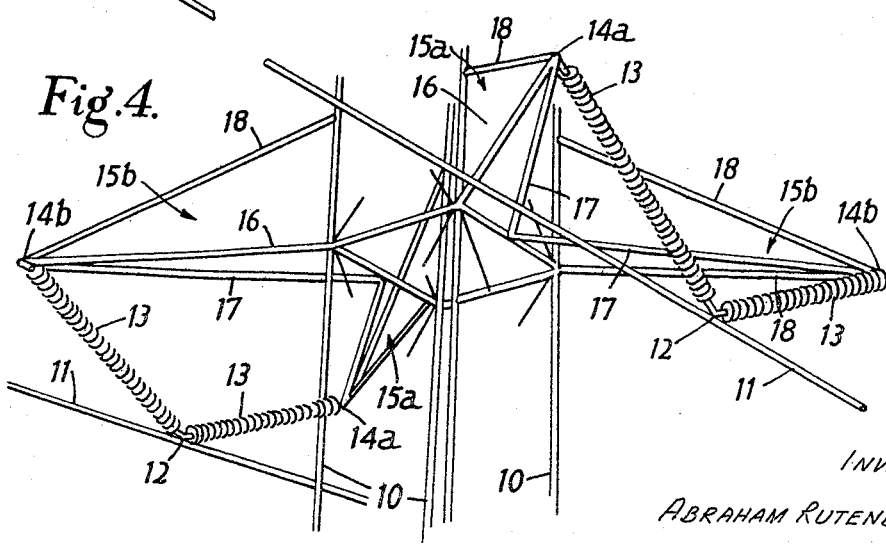
INVENTOR
ABRAHAM RUTENBERG
BY Young + Thompson
ATTYS.

United States Patent Office 3,482,031
Patented Dec. 2, 1969

3,482,031
HIGH TENSION ELECTRIC POWER CONDUCTOR SUSPENSION ARRANGEMENTS
Abraham Rutenberg, 13 Panorama Road,
Mount Carmel, Haifa, Israel
Filed Oct. 26, 1967, Ser. No. 678,379
Claims priority, application Great Britain, Nov. 2, 1966,
49,207/66
Int. Cl. H02g 7/20
U.S. Cl. 174—45          9 Claims

ABSTRACT OF THE DISCLOSURE

Line conductor supporting arrangement for an intermediary tower of an overhead high tension transmission line in which two insulators extend upwardly in opposite directions from a common point of attachment to the line conductor to spaced fixed anchorage points on the tower structure, the respective centre lines of said insulators being each at an inclination of about 30° to the horizontal and each lying in a common vertical plane which also includes the axis of the line conductor.

---

This invention relates to overhead high tension electric transmission lines and in particular, although not exclusively, to arrangements for supporting extra high tension conductors on the intermediary towers or pylons which usually represent 80% or more of the total number of towers or pylons in any one of such transmission lines.

The term "line conductor" when used herein is intended to include a bundle of two or more spaced-apart but nevertheless electrically connected conductors, while the term "insulator" is intended to mean a complete structure whether in the form of a single member or of several interconnected insulator members or insulator units. The term is also intended to include a compound arrangement comprising two or more insulators as above defined which are disposed in side-by-side parallel relationship and mechanically interconnected with one another to operate as a single mechanical support device.

The ever increasing demand for electric power leads to increase of the voltage used for transmission by overhead power lines. Such increase of transmission voltage necessitates increased length of the insulators employed to support the line conductors. With the conventional vertical disposition of the supporting insulators, this leads in turn to increase of the overall height of the tower or pylon if the clearance above ground and between lines if several are arranged one above the other, is to be even maintained at its normal, lower voltage, level let alone increased as it should be theoretically in view of the higher voltage. Even more important is the increase in the adverse effects of pollution of the atmosphere with accumulation of conductive deposits upon the insulators with resultant eventual flashover and breakdown. Such vertical disposition is particularly disadvantageous inasmuch as the lower ends of the insulators tend to become heavily contaminated due to the transfer of deposits from the higher parts of the insulator by the dripping of rain or condensed moisture from the upper regions. Such more heavily contaminated regions of each insulator are, unfortunately, at the region where the voltage gradient along the insulator length is highest so that the risk of breakdown is correspondingly increased.

All of the above factors make it difficult to increase the operating voltage of an overhead transmission line while still continuing to employ the existing towers or pylons.

In order to avoid or at least reduce the above discussed difficulties it has been proposed to employ a horizontal or substantially horizontal disposition for the necessarily elongated insulators used in such transmission lines in order to obtain the benefit of the greatly improved natural cleansing of the insulator surfaces by rain which then occurs and the freedom from the above mentioned deposit accumulation on the lower portion of any vertical insulator due to the transfer thereonto by dripping of rain or condensed moisture. In addition such horizontal or near horizontal disposition will allow substantial reduction of the necessary overall height of the tower, pylon or other structure or, alternatively, will permit the use of an existing tower or the like for supporting a transmission line which is to be operated at a substantially higher voltage than that for which such tower is suitable when normal vertical insulators are employed. The last mentioned advantages are particularly pertinent when several different line conductors need to be supported on each tower or like structure one above the other.

I have already proposed a transmission line supporting arrangement in which each line conductor is supported at each suspension point by means of two insulators which are arranged to extend in opposite directions transverse to the conductor length with the centre or axial line of each insulator inclined at an angle of the order of 30° to the horizontal plane, the respective opposite ends of such insulators being connected to spaced-apart anchorage points on the tower or other support structure whereby the respective centre or axial lines of such insulators lie at an angle of the order of 120° to each other.

Such disposition of the respective insulators as just described with their longitudinal axes transverse to the line conductor length can be disadvantageous since it may result in increase of the width of the necessary wayleave required to accommodate the line, or introduce difficulties in the design or construction of the tower or other support structure itself. In particular it may be disadvantageous in the case where it is desired to modify already existing towers or pylons of the type having cross arms for supporting the line conductors by vertical suspension insulators in order to use such transverse inclined insulator system.

One object of the present invention is to provide an improved arrangement which does not increase the necessary length of each transverse support arm portion of a tower or pylon, which does not increase materially either the cost or weight of such tower or the area of ground needed for accommodation of the transmission line and which is more convenient for use in the construction or modification of the above mentioned known forms of towers or pylons.

In accordance with the present invention at each line conductor supporting point of an intermediary tower or pylon two insulators are employed and are arranged to extend in opposite directions to one another relative to a common point of attachment thereof to the line conductor and with their respective axial or centre lines at an inclination of the order of 30° from the horizontal, said insulators being so positioned that the vertical plane containing such axial lines of the insulators includes also the axis of the line conductor or is at only some comparatively slight angle to such line conductor.

By such construction the previously mentioned advantages of improved natural cleansing and reduced height for a given line voltage are retained while permitting retention of an existing form of tower or pylon, any necessary changes in the latter being confined mainly to the structure of the cross arms.

In order that the nature of the invention may be better understood, a number of embodiments will now be described by way of illustrative example only and with reference to the accompanying drawing in which:

FIGURE 1 is an, largely diagrammatic, elevational view of an intermediary tower or pylon provided with a suspension arrangement according to the invention.

FIGURE 2 is a, again largely diagrammatic, plan view of the arrangement of FIGURE 1.

FIGURE 3 is a fragmentary, enlarged scale, side elevation of the suspension components for one line conductor of the arrangement shown in FIGURES 1 and 2.

FIGURE 4 is a perspective view, drawn to a still further enlarged scale, of the suspension components provided on each side of the tower for a pair of line conductors in the arrangement of FIGURES 1–3.

FIGURE 5 is a fragmentary perspective view of part of FIGURE 4 showing a modification.

Referring to the drawings, 10 indicates an intermediary transmission line support tower of generally conventional form for suspending high tension line conductors 11, three line conductors being shown on each side. As shown more clearly in FIGURES 2, 3 and 4 each line conductor 11 is attached at point 12 by means of a suitable fitting or clamp to the adjacent ends of two insulators 13 which extend from point 12 upwardly with their respective axial or centre lines at an angle of approximately 30° to the horizontal. Such insulators are connected at their opposite upper ends to fixed anchorage points 14a, 14b located at the respective outer ends of two lateral support arms indicated generally at 15a and 15b. Each of such arms 15a, 15b is formed of suitable structural metal and comprises a pair of horizontal divergent limbs 16, 17 and a third, upwardly inclined, limb 18. Each of said limbs is secured at its other, inner, end to the main framework of the tower. The arms 15a, 15b are constructed to afford the requisite horizontal spaced-apart anchorage points 14a, 14b for the upper ends of the two insulators 13.

As may be seen more clearly from the plan view of FIGURE 2 the anchorage points 14a, 14b each lie above the conductor 11 whereby that, imaginary, vertical plane which includes the longitudinal axes of the insulators 13 also includes the axis of the line conductor 11 lying beneath such insulators. The vertical plane including the insulator axes may, however, be at some slight angle to the conductor axis. In such circumstances the respective lengths of the two lateral support arms 15a, 15b may be unequal.

Instead of attaching the line conductor 11 directly to the interconnection point of the two insulators 13, such conductor may, as shown in FIGURE 5, be suspended from such interconnection point 12 by means of an additional short insulator 19.

I claim:

1. An arrangement for supporting a line conductor of an overhead high tension electric transmission line upon an intermediary tower or pylon, which comprises two insulators arranged to extend in opposite directions to one another relative to a common point of attachment of such insulators to said line conductor and with their respective axial or centre lines at an inclination of the order of 30° from the horizontal, said insulators being so positioned that the vertical plane containing such axial lines includes also the axis of the supported line conductor.

2. An arrangement according to claim 1 in which said two insulators extend upwardly above the line conductor.

3. An arrangement according to claim 2 in which said line conductor is suspended directly from a common interconnection point between the adjacent ends of said insulators.

4. An arrangement according to claim 2 in which said line conductor is suspended by means of an additional short insulator from a common interconnection point between the adjacent ends of said insulators.

5. An arrangement for supporting a line conductor of an overhead high tension electric transmission line upon an intermediary tower or pylon which comprises first and second insulators arranged to extend in opposite directions to one another relative to a common point of attachment of one end of each of said insulators to said line conductor, the opposite end of said first insulator being connected to a first stationary suspension point on said tower or pylon and the opposite end of said second insulator being connected to a second stationary suspension point on said tower or pylon, said second suspension point being spaced from said first suspension point and the respective axial lines of said insulators each being at an angle of approximately 30° from the horizontal and lying in a plane which includes also the axis of the supported line conductor.

6. An arrangement for supporting a line conductor of an overhead high tension electric transmission line upon an intermediary tower or pylon which comprises first and second elongated suspension insulators arranged to extend in opposite directions to one another relative to a common point of attachment of one end of each of said insulators to said line conductor, the opposite end of said first insulator being connected to a first stationary suspension point on said tower or pylon and the opposite end of said second insulator being connected to a second stationary suspension point on said tower or pylon, said first and second suspension points being spaced apart in a horizontal plane above said line conductor, the respective axial or centre lines of said insulators each being at an angle of 30° from the horizontal and lying in a plane which lies substantially parallel with the axis of the supported line conductor.

7. An arrangement for supporting a line conductor of an overhead high tension transmission line which comprises an intermediary tower or pylon having a framework, first and second lateral support arms extending horizontally and outwardly from said framework to define two stationary anchorage points which are spaced apart in the horizontal direction, two elongated electric insulators extending respectively one from each of said anchorage points, the lower ends of said insulators being coupled together and means coupling said line conductor to said coupled lower ends of said insulators, each of said insulators having its respective centre line at an inclination of 30° from the horizontal and disposed in a vertical plane substantially parallel with the axis of said conductor.

8. An arrangement for supporting a line conductor of an overhead high tension transmission line according to claim 7 in which each of said lateral support arms comprises a pair of horizontally convergent limbs connected together at their outermost ends and secured at their inner ends to spaced positions on said framework, and a third downwardly inclined limb united at its outer end with the outermost ends of said horizontal limbs and also secured at its inner end to said framework.

9. An arrangement according to claim 7 in which said means coupling said line conductor to said coupled lower ends of said insulators comprises a third vertical suspension insulator.

References Cited

UNITED STATES PATENTS

| | | | |
|---|---|---|---|
| 1,160,544 | 11/1915 | Steinberger | 174—148 X |
| 1,916,100 | 6/1933 | Earnhardt | 248—58 |
| 2,587,587 | 4/1952 | Bellezza et al. | 174—148 X |
| 3,221,093 | 11/1965 | Richardson. | |
| 3,264,400 | 8/1966 | Taylor | 174—148 X |

LARAMIE E. ASKIN, Primary Examiner

U.S. Cl. X.R.

174—148